United States Patent [19]

Evans

[11] Patent Number: 5,085,891
[45] Date of Patent: Feb. 4, 1992

[54] EDGE SEALING APPARATUS AND METHOD

[75] Inventor: Ronald F. Evans, Pangkor, Singapore

[73] Assignee: Nordson Corporation, Westlake, Ohio

[21] Appl. No.: 553,994

[22] Filed: Jul. 16, 1990

[51] Int. Cl.⁵ .................... B05D 3/12; B05D 5/00; B05D 1/26; B05C 3/20
[52] U.S. Cl. ............................ 427/277; 427/284; 118/407; 118/415
[58] Field of Search .............. 118/410, 413, 407, 415; 427/284, 208.2, 277

[56] References Cited

U.S. PATENT DOCUMENTS

| | | | |
|---|---|---|---|
| 4,245,585 | 1/1981 | Bocquet | 118/410 |
| 4,735,169 | 4/1988 | Cawston et al. | 118/411 |
| 4,844,004 | 7/1989 | Hadzimihalis et al. | 118/411 X |

FOREIGN PATENT DOCUMENTS 2233322  1/1973  Fed. Rep. of Germany ...... 118/410

OTHER PUBLICATIONS

Application Bulletin, No. M-070-45, Nordson Corporation, 1988, 2 pages.

Primary Examiner—Evan Lawrence
Attorney, Agent, or Firm—Wood, Herron & Evans

[57] ABSTRACT

An edge sealing apparatus for composite boards comprises a heatable iron body having a bottom, presser surface formed with a shape or profile which conforms to that of the edge of the composite board to be sealed. In the method of edge sealing, the iron body mounts a slot nozzle formed with a discharge outlet having the same profile as the iron body and the edge of the board. The slot nozzle receives a sealing material such as hot melt thermoplastic adhesive from a dispensing device, and is effective to apply a coating of the hot melt adhesive along the entire surface area of the profile of the board edge. Immediately after the hot melt adhesive is applied to the edge of the board, the presser surface of the heated iron body presses or fuses such material therein to provide good penetration into the board edge and thus obtain a substantially complete seal.

12 Claims, 2 Drawing Sheets

EDGE SEALING APPARATUS AND METHOD

FIELD OF THE INVENTION

This invention relates to sealing apparatus, and, more particularly, to an apparatus for applying a coating of sealing material onto the edges of a composite board to seal the edges and prevent the entry of moisture therein. The present invention also includes a method of edge sealing using the apparatus.

BACKGROUND OF THE INVENTION

In the manufacture of composite boards such as particle board, waferboard, and oriented strand board, layers and/or particles of wood and other materials are adhesively bonded and pressed together. The edges of such boards typically have either a flat profile, or a tongue-and-groove profile, depending upon the requirements of a particular application.

Composite boards of the type described above are commonly used in the fabrication of residential and commercial flooring and other applications where it is desirable to seal the edges and prevent the entry of moisture therein. Moisture intrusion into the board edges causes them to swell or warp over time, which, in flooring applications, can create unevenness and cracking of floor coverings such as tile, linoleum and the like.

One method of sealing the edges of composite boards has been to spray a solvent, a water-based sealer, waxes or other sealing materials onto the edges of composite board to obtain the desired seal. One problem with the use of solvents is that they create environmental hazards due to evaporation during handling and/or application onto the composite board. In addition, over-spraying or mis-spraying of sealing materials onto the edges of the board is a recurring problem with this method resulting in undesirable clean-ups, excess usage of material and rejects.

Another method of sealing the edges of composite boards involves the extrusion of a sealing material such as hot melt adhesive directly onto the board edge with an adhesive dispenser and a heated coating die. The coating die rests on the corners of the composite board, spanning the edge to be coated, so that the sealing material is spread over the entire surface area of the edge. While problems of overspray and/or mis-spraying are reduced with this method, the sealing material fails to penetrate into the edges of the board and can be relatively easily dislodged during shipment, handling and/or after a period of use of the board.

SUMMARY OF THE INVENTION

It is therefore among the objectives of this invention to provide a method and apparatus for sealing the edges of composite boards such as particle board, waferboard and oriented strand board which avoids environmental hazards and which provides a reliable, longlasting seal in such edges.

These objectives are accomplished in an edge sealing apparatus for composite boards which comprises a heatable iron with a body (iron body) having a bottom, presser surface formed with a shape or profile which conforms to that of the edge of the composite board to be sealed. The iron body mounts a slot nozzle formed with a discharge outlet having the same profile as the iron body and the edge of the board. The slot nozzle receives a sealing material such as hot melt thermoplastic adhesive from a dispensing device, and is effective to apply a coating of the hot melt adhesive along the profile of the edge of the composite board. Immediately after the hot melt adhesive is applied to the edge of the board, the heated iron body presses or fuses such material therein to provide good penetration into the board edge and thus obtain a substantially complete seal.

This invention is therefore predicated upon the concept of first applying a layer of sealing material, such as hot melt thermoplastic adhesive, onto the edge of a composite board, and then immediately pressing or fusing the hot melt adhesive into the edge by the bottom, presser surface of an iron body which has the same profile as the board edge. This ensures that the entire surface of the edge of the composite board is efficiently and completely covered with hot melt adhesive, and that such adhesive penetrates into the side edge to create a reliable, longlasting seal.

In the presently preferred embodiment, the slot nozzle comprises an inner blade mounted to one end of the iron body, an outer blade and a shim interposed between the inner and outer blades. The shim has an elongated slot which is connected by a passageway formed in the inner blade to a supply of hot melt adhesive such as an adhesive dispenser. The adhesive is transmitted through such passageway into the slot formed by the shim between the inner and outer blades, and then out the bottom of the slot which forms the discharge outlet of the slot nozzle. The bottom portion of each of the inner and outer blades and shim is formed with the same profile as that of the edge of the board and the iron body to ensure that a uniform coating of hot melt adhesive is applied onto substantially the entire surface of the board edge.

The slot nozzle is mounted to the iron body by a U-shaped clamp and an adjustment screw. The adjustment screw is effective to move the slot nozzle upwardly and downwardly with respect to the bottom, presser surface of the iron body which, in turn, moves the discharge outlet of the slot nozzle toward and away from the edge of the composite board. By varying the space between the discharge outlet of the slot nozzle and edge of the composite board, the thickness of the coating or layer of hot melt adhesive applied thereto can be altered as desired. Additionally, the U-shaped clamp permits easy assembly or disassembly of the slot nozzle from the iron body so that one slot nozzle can be replaced with another to accommodate composite boards of different thicknesses.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 4:
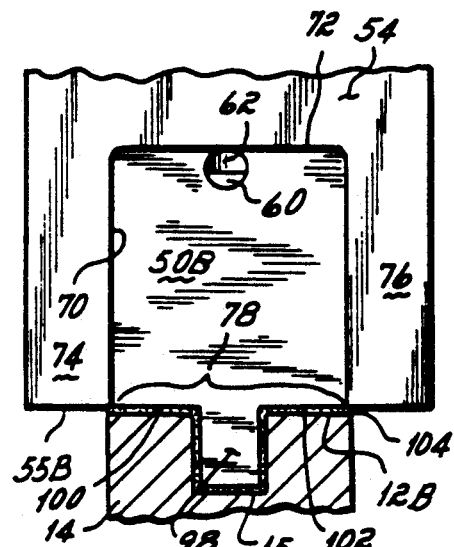
FIG. 4 is a view similar to FIG. 3 except with a composite board having a different edge profile.
Figure 6:
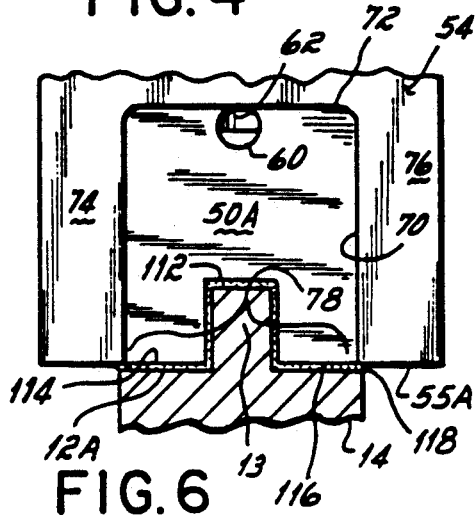
FIG. 6 is a view similar to FIGS. 3 and 4 except of a still different edge profile of a composite board.

Referring to the figures, the edge sealing apparatus 10 of this invention is intended to apply a layer or coating of sealing material such as hot melt adhesive onto the edge 12 of a composite board 14 and to press or fuse the adhesive layer into such edge 12 so that the adhesive penetrates into the edge 12 and provides a reliable, substantially watertight seal. The term "composite board" 14 as used herein is meant to refer to any one of a number of board constructions in which layers, particles or strands of material are adhesively bonded and pressed together to form a board such as particle board, waferboard, oriented strand board and the like. The edges of such boards 14 typically have a flat profile, such as the flat edge 12 shown in FIG. 1, or, alternatively, two edges of the board 14 are formed with a "tongue-and-groove" profile, i.e., a longitudinally extending extension or tongue 13 is formed on one edge 12A as shown in FIG. 6 and a longitudinally extending groove 15 is formed on the opposite edge 12B as shown in FIG. 4. The method and apparatus for sealing each type of board edge profile is described below.

Figure 1:
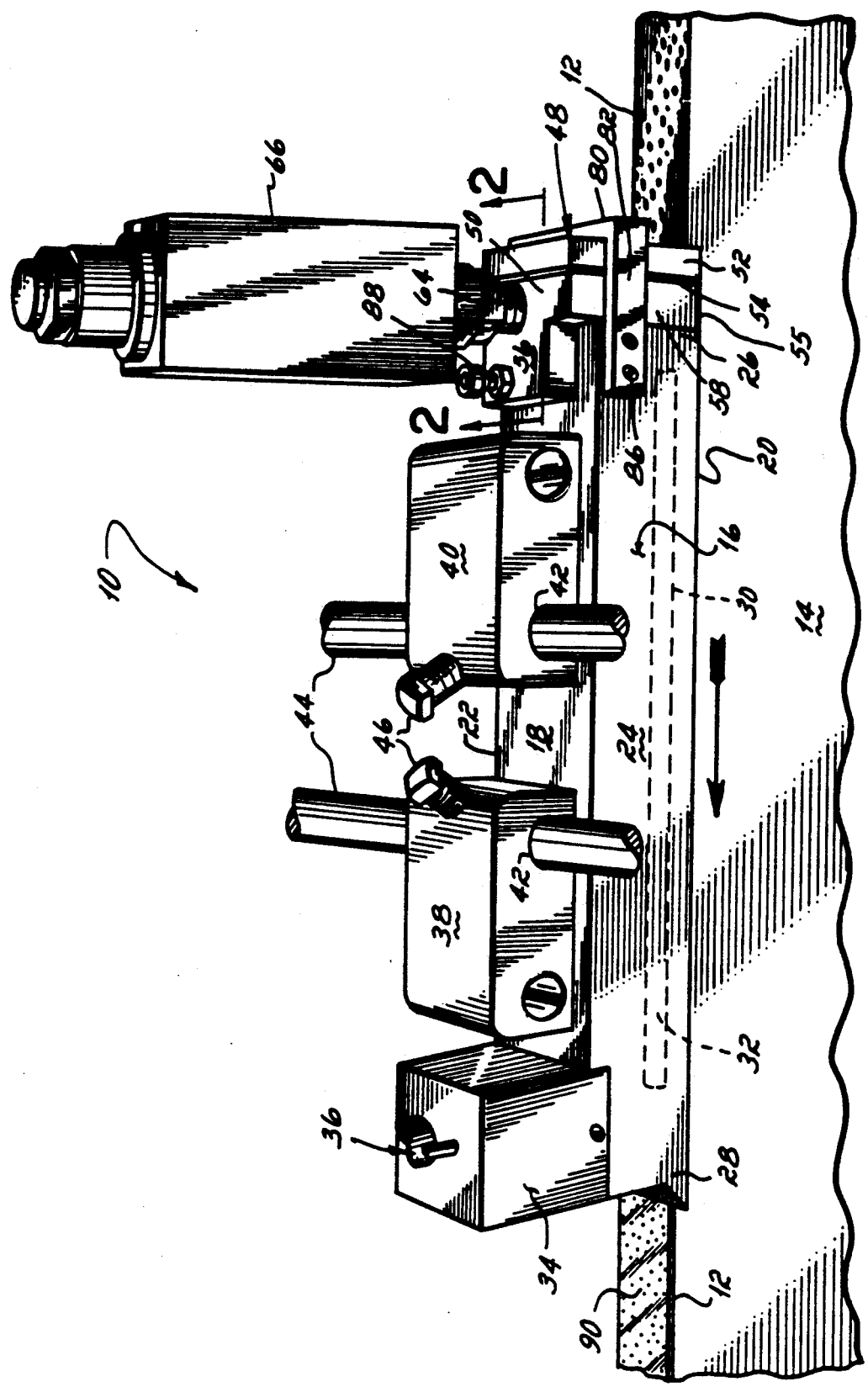
FIG. 1 is a schematic view of the edge sealing apparatus of this invention illustrated in position on the edge of a composite board.
Figure 2:
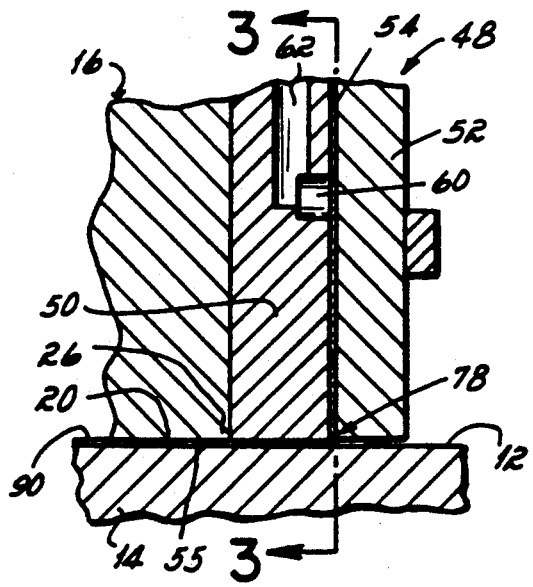
FIG. 2 is a cross-sectional view taken generally along 2—2 of FIG. 1.
Figure 3:
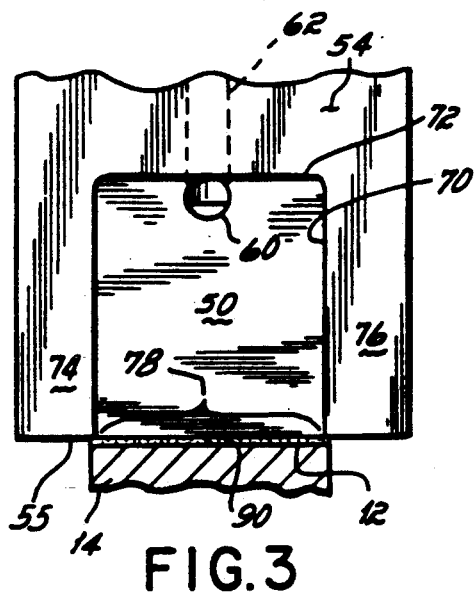
FIG. 3 is a view taken generally along line 3—3 of FIG. 2.

Referring to FIGS. 1-3, the apparatus 10 comprises an iron body 16 having a top surface 18, a profiled, bottom or presser surface 20 which conforms to the shape of the board edge 12, 12B or B as described in more detail below, opposed sides 22, 24, a leading or board entry end 26, and a trailing or board exit end 28. In the presently preferred embodiment, the iron body 16 is formed of brass or other suitable thermally conductive material. An elongated bore 30 is formed in the iron body 16 which receives a cartridge heater 32 connected within a cover box 34 to a cord set 36 leading to a source of power (not shown). An RTD (not shown) or similar device is also mounted in the iron body 16 to monitor its temperature The cartridge heater 32 is effective to heat the entire iron body 16 to a temperature which is approximately equal to the temperature of the particular hot melt adhesive applied to the edge 12 of composite board 14 in the manner discussed below.

The edge sealing apparatus 10 is mounted in position with respect to the edge 12, 12A or B of composite board 14 by a pair of mounting blocks 38 and 40 each having bores 42 which receive a support rod 44. A set screw 46 is provided for each mounting block 38, 40 which threads into engagement with their respective support rods 44 to retain the edge sealing apparatus 10 at the appropriate position relative to the composite board 14. As shown schematically by the arrow in FIG. 1, the edge sealing apparatus 10 is held in a fixed position by the mounting blocks 38, 40 and support rods 44, while an edge 12, 12A or B of composite board 14 is moved therepast.

With reference to the righthand portion of the apparatus 10 as shown in FIG. 1 and FIGS. 2 and 3, the structure for supplying hot melt thermoplastic material, or other suitable sealing material, is illustrated in detail. In the presently preferred embodiment, the leading end 26 of iron body 16 mounts a slot nozzle 48 which comprises an inner blade 50, an outer blade 52, and a yoke-shaped shim 54 which collectively form a bottom surface 55, 55A or B shaped to conform to the profile of the edge 12, 12A or B, respectively, of composite board 14 as described in more detail below. The inner blade 50 is generally T-shaped, as seen from the top, having a head section 56 which overlies the top surface 18 of iron body 16 and a depending stem section 58 which rests against the leading end 26 of iron body 16. As viewed in FIGS. 1 and 2, the stem section 58 of inner blade is formed with a horizontally oriented port 60 connected to a vertically oriented fluid passageway 62 extending through the head section 56 of inner blade 50. This fluid passageway 62 terminates at a threaded inlet 64 in the head section 56 of inner blade 50 which mounts an adhesive dispensing module 66. The module 66 is connected to a source of hot melt thermoplastic adhesive (not shown) and is preferably of the type such as sold under the designation Model H20 or Model H200 which are commercially available from the assignee of this invention, Nordson Corporation of Amherst, Ohio. It is contemplated, however, that essentially any other commercially available adhesive dispenser could be employed with the slot nozzle 48 herein.

As viewed in FIGS. 2 and 3, the yoke-shaped shim 54 is a thin plate which is formed with a rectangular-shaped cut-out or slot 70 defining an upper edge 72 and a pair of spaced legs 74 and 76. The lowermost end of the slot 70 forms a discharge outlet 78 which, in the embodiment of FIGS. 1-3, is shaped to conform to the profile of the edge 12 of board 14. Preferably, the transverse dimension of the slot 70 and its discharge outlet 78 is about 0.1 millimeters less than the thickness of the edge 12, 12A or B of composite board 14.

The slot nozzle 48 is assembled by interposing the shim 54 between the inner and outer blades 50, 52 and affixing a U-shaped clamp 80 around the blades 50, 52 such that the legs 82 of the clamp 80 extend at least partially along the sides 22, 24 of the iron body 16, respectively, where they are held in place by screws 86 or other suitable fastening means. In the assembled position, the inner blade 50 rests against the leading end 26 of iron body 16, and the shim 54 is interposed between the inner and outer blades 50, 52 such that the upper edge 72 of slot 70 is located immediately above the port 60 in inner blade 50.

Sealing material such as hot: thermoplastic adhesive is directed through the fluid passageway 62 and port 60 of inner blade into the slot 70 formed between the legs 74, 76 of shim 54 to the discharge outlet 78 thereof where it is applied to the board edge 12. Preferably, the vertical position of the slot nozzle 48 with respect to the board edge 12 is adjustable by means of an adjustment screw 88 extending between the inner blade 50 of slot nozzle 48 and the top surface 18 of the iron body 16. Variation of the vertical position of die head with respect to the board edge 12 allows for variation of the thickness of the coating or layer 90 of hot melt thermoplastic adhesive applied to such board edge 12, as desired.

With reference to FIGS. 2-7, the bottom surface 20 of the iron body 16 and the bottom surface 55 of slot nozzle 48 are each formed with a profile or shape which conforms to that of the edge 12, 12A or B of composite board 14. In FIGS. 2 and 3, the bottom surface 55 of slot nozzle 48, collectively defined by the lowermost ends of the inner and outer blades 50, 52 and shim 54, are formed in an essentially flat profile to conform to the flat edge 12 of composite board 14. The discharge outlet 78 of the slot nozzle 54 also has a "flat" profile to lay down a layer 90 of adhesive along the edge 12 of composite board 14.

Figure 5:
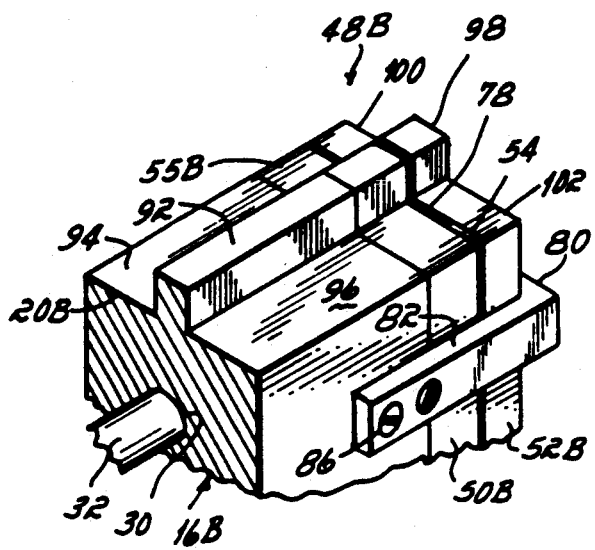
FIG. 5 is a partial perspective view of the iron body and slot nozzle used with the composite board shown in FIG. 4.

As mentioned above, the composite board 14 is also commonly formed with a "tongue-and-groove" type of edge connection. In FIGS. 4 and 5, the edge 12B of board 14 is formed with a longitudinally extending groove 15 and both the iron body 16B and slot nozzle 48B are shaped to conform to that configuration. The iron body 16B is formed with a bottom, presser surface 20B including a center projection 92 insertable within the groove 15 and flat surfaces 94, 96 on opposite sides of the projection 92. Similarly, the inner blade 50B and outer blade 52B slot nozzle 48B collectively form a bottom surface 55B having an extension or projection 98 insertable within groove 15 and flat surfaces 100, 102 on either side of extension 98. The projection 98 and flats 100, 102 form the discharge outlet 78B of slot nozzle 48B which conforms to the shape or profile of the edge 12B such that a layer 104 of adhesive material is directed through the slot 70 in shim 54 and applied over the entire surface area of edge 12B, as can be seen in FIGS. 4 and 5.

Figure 7:
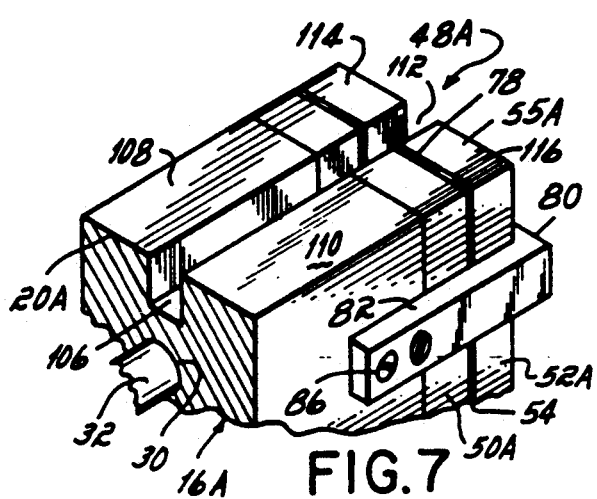
FIG. 7 is a partial perspective view of the iron body and slot nozzle used with the composite board shown in FIG. 6.

With reference to FIGS. 6 and 7, the edge 12A of board 14 is formed with a longitudinally extending tongue 13. In order to conform to that shape, the iron body 16A is formed with a bottom presser surface 20A including a center channel 106 which receives the tongue 13 and a pair of flat surfaces 108 and 110 on either side of the channel 106. The inner blade 50A and outer blade 52A of slot nozzle 48A collectively form a bottom surface 55A in this embodiment having a center channel 112 which receives tongue 13 and flat surfaces 114, 116 on either side of channel 112. The channel 112 and flats 114, 116 form the discharge outlet 78A of slot nozzle 48A which conforms to the shape of board edge 12A to ensure that a layer 118 of adhesive is applied along the entire surface of board edge 12A.

The method of sealing the edges of board 14 proceeds as follows. An edge 12, 12A or 12B is moved in the direction of the arrow in FIG. 1 past the fixed sealing apparatus 10. The slot nozzle 48, 48A or 48B is presented to the board edge 12, 12A or B initially and applies a coating or layer 90, 104 or 118 of hot melt thermoplastic adhesive having a desired thickness onto an edge 12, 12A or 12B, respectively, of the composite board 14. The iron body 16, 16A or 16B trails the slot nozzle 48, 48A or 48B and its bottom, presser surface 20, 20A or 20B engages the board edge 12, 12A or 12B, respectively. The iron body is heated by the cartridge heater 32 to a temperature approximately equal to the temperature of the hot melt adhesive, and its bottom surface 20, 20A or B is effective to both heat and press the hot melt adhesive into the board edge such that the adhesive penetrates and fuses therein to form an effective seal at the board edge 12, 12A or 12B.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for sealing an edge of a board, comprising:
   an iron body having a leading end and a presser surface formed with a shape which conforms to the shape of an edge of the board;
   a nozzle located at said leading end of said iron body, said nozzle comprising:
   (i) a first blade mounted to said leading end of said iron body, said first blade being formed with a passage connected to said supply means;
   (ii) a second blade carried by said iron body;
   (iii) a shim connected between said first and second blades, said shim being formed with a slot defining said discharge outlet of said nozzle, said slot being connected to said passage in said first blade to receive sealing material and to discharge the sealing material onto the edge of the board; and
   supply means for supplying sealing material to said nozzle, the sealing material being emitted from said discharge outlet of said nozzle onto the edge of the board and thereafter pressed into the edge of the board by said presser surface of said iron body to seal the edge of the board.

2. Apparatus for sealing an edge of a board, said edge having a profile formed with a tongue, comprising:
   an iron body having a leading end, and a presser surface formed with a profile which conforms to the profile of said edge of the board including a notch which receives the tongue of the board edge;
   means for heating said iron body;
   a nozzle mounted to said leading end of said iron body, said nozzle having a discharge outlet which is shaped to conform to the profile of the edge of the board including a notch which receives the tongue of the board edge; and
   supply means for supplying sealing material to said nozzle, the sealing material being emitted from said discharge outlet of said nozzle onto the edge of the board and thereafter pressed into the edge of the board by said presser surface of said iron body to seal the edge of the board.

3. The apparatus of claim 2 in which said nozzle comprises:
   a first blade mounted to said leading end of said iron body, said first blade being formed with a passage connected to said supply means;
   a second blade carried by said iron body;
   a shim connected between said first and second blades, said shim being formed with a slot defining said discharge outlet of said nozzle, said slot being connected to said passage in said first blade to receive sealing material and to discharge the sealing material onto the edge of the board.

4. The apparatus of claim 2 in which said nozzle includes adjustment means for adjusting the position of said discharge outlet with respect to said presser surface of said iron body to permit variation of the thickness of the sealing material applied to the edge of the composite board.

5. Apparatus for sealing an edge of a board, comprising:
   an iron body having a top surface, a bottom presser surface, opposed sides, a leading end and a trailing end, said bottom presser surface being formed with the same shape as an edge of the board;

means for heating said iron body;

a slot nozzle having a discharge outlet which has the same shape as the edge of the board;

adjustment means for mounting said slot nozzle to said leading end of said iron body so that said discharge outlet of said slot nozzle is adjustable with respect to said bottom presser surface of said iron body to permit variation of the thickness of the sealing material applied to the edge of the board; and supply means for supplying sealing material to said slot nozzle, the sealing material being emitted from said discharge outlet of said nozzle onto the edge of the board and thereafter pressed into the edge of the board by said presser surface of said iron body.

6. The method of sealing an edge of a board, comprising:

discharging a coating of sealing material from the discharge outlet of a slot nozzle onto the edge of the board; and passing the presser surface of an iron body over said coating to force said coating into the edge of the board to penetrate and seal the edge.

7. The method of claim 6 in which said step of discharging a coating of sealing material comprises producing relative movement between the edge of the board having a given profile and the discharge outlet of the slot nozzle which is formed with the same profile as the edge of the board.

8. The method of sealing the profiled edge of a board, comprising:

producing relative movement between the profiled edge of the board and a slot nozzle having a discharge outlet formed with the same shape as the profiled edge of the board;

discharging a coating of hot melt adhesive from said discharge outlet onto substantially the entire surface of the profiled edge of the board; and forcing the coating of hot melt adhesive into the profiled edge of the board with the presser surface of a heated iron body having the same profile as the edge of the board so that the coating of hot melt adhesive penetrates into the profiled edge of the board and fuses to form a seal.

9. Apparatus for sealing an edge of a board, comprising:

an iron body having a leading end and a presser surface formed with a shape which conforms to the shape of an edge of the board;

a nozzle located at said leading end of said iron body, said nozzle having a discharge outlet;

adjustment mans for adjusting the position of said discharge outlet of said nozzle with respect to said presser surface of said iron body to permit variation of the thickness of the sealing material applied to the edge of the board; and supply means for supplying sealing material to said nozzle, the sealing material being emitted form said discharge outlet of said nozzle onto the edge of the board and thereafter pressed into the edge of the board by said presser surface of said iron body to seal the edge of the board.

10. Apparatus for sealing an edge of a board, said edge having a profile formed with a groove, comprising:

an iron body having a leading end, and a presser surface formed with a profile which conforms to the shape of an edge of the board including an extension which extends into the groove of the board edge;

means for heating said iron body;

a nozzle mounted to said leading end of said iron body, said nozzle having a discharge outlet which is shaped to conform to the profile of the edge of the board including an extension which extends into the groove of the board edge; and supply means for supplying sealing material to said nozzle, the sealing material being emitted from said discharge outlet of said nozzle onto the edge of the board and thereafter pressed into the edge of the board by said presser surface of said iron body to seal the edge of the board.

11. The apparatus of claim 10 in which said nozzle comprises:

a first blade mounted to said leading end of said iron body, said first blade being formed with a passage connected to said supply means;

a second blade carried by said iron body;

a shim connected between said first and second blades, said shim being formed with a slot defining said discharge outlet of said nozzle, said slot being connected to said passage in said first blade to receive sealing material and to discharge the sealing material onto the edge of the board.

12. The apparatus of claim 10 in which said nozzle includes adjustment means for adjusting the position of said discharge outlet with respect to said presser surface of said iron body to permit variation of the thickness of the sealing material applied to the edge of the composite board.

* * * * *

UNITED STATES PATENT AND TRADEMARK OFFICE
CERTIFICATE OF CORRECTION

PATENT NO. : 5,085,891
DATED : February 4, 1992
INVENTOR(S) : Ronald F. Evans

It is certified that error appears in the above-identified patent and that said Letters Patent is hereby corrected as shown below:

Column 7, line 51, "shape" should be --profile--.

Signed and Sealed this

Thirty-first Day of August, 1993

*Attest:*

BRUCE LEHMAN

*Attesting Officer*   *Commissioner of Patents and Trademarks*